W. Y. HEADLEY.
OILING DEVICE.
APPLICATION FILED APR. 29, 1921.
1,416,202.
Patented May 16, 1922.
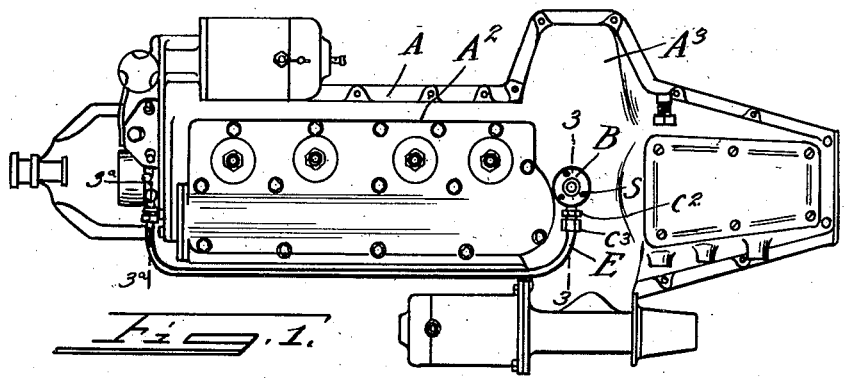
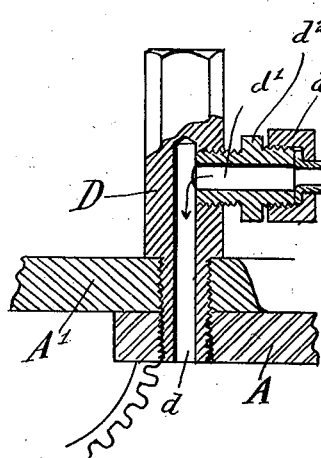
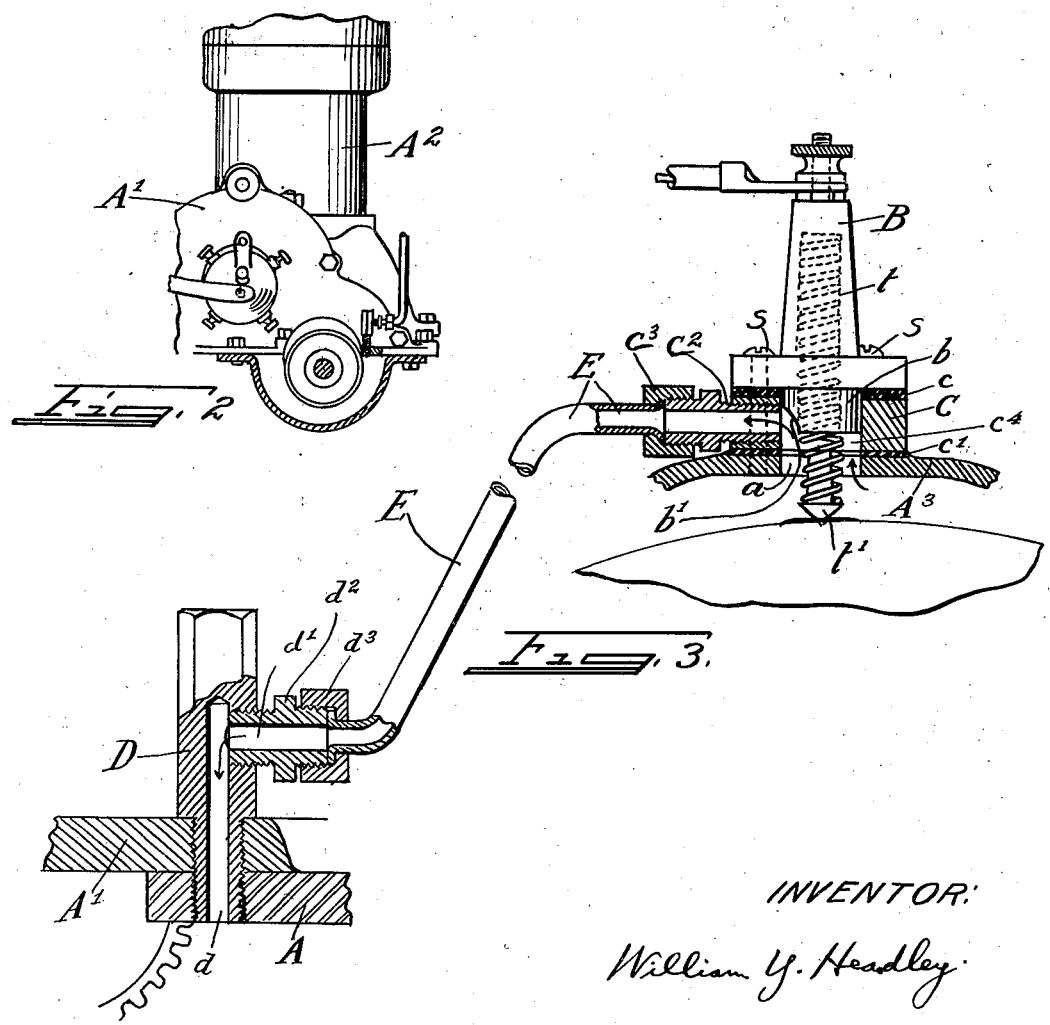
INVENTOR:
William Y. Headley.
BY Walter A. Knight
ATTORNEY.

UNITED STATES PATENT OFFICE.

WILLIAM Y. HEADLEY, OF CINCINNATI, OHIO.

OILING DEVICE.

1,416,202.  Specification of Letters Patent.  Patented May 16, 1922.

Application filed April 29, 1921. Serial No. 465,612.

*To all whom it may concern:*

Be it known that WILLIAM Y. HEADLEY, a citizen of the United States, residing at Cincinnati, in the county of Hamilton and State of Ohio, has invented new and useful Improvements in Oiling Devices, of which the following is a specification.

My invention relates to the means and method in common use in the distribution of oil in the lubrication of automobile mechanism of the Ford type, commonly known as the "splash system", and embraces improvements in and simplification of the devices used for the purpose as herein set forth.

It is common in such engines to carry the oil from the transmission case to the gear case by means of a pipe or tube located either inside or outside of the casings and the oil then flows back by gravity from the gear case to the crank case and from the crank case to the transmission case.

Where the oil pipe or tube is located inside the casings, it frequently becomes inefficient through clogging with gum and sediment from the oil and from the transmission band lining and must then be removed and cleaned out, necessitating tearing down much of the mechanism, making an expensive and tedious job. Those having the oil pipe or tube located outside the casing seek to avoid this difficulty but all of them have certain defects and disadvantages not found in my device and are more complicated and expensive.

My invention does not require the drilling or tapping of the casing either of the transmission case or of the gear case. It permits the use of the standard magneto plug simply adding the special parts hereinafter illustrated and described and providing a very simple, effective, and inexpensive means of securing continuous circuit flow of the lubricant.

In the particular embodiment of my invention selected for illustration,—

Figure 1 is a top plan view of the exterior of an ordinary Ford engine, with my invention in position for use.

Fig. 2 is a front elevation of the engine with a part of the gear case in section and with a part of the flange of the gear cover broken away and in section to show the inlet plug and its oil tube connection; the inlet plug terminating in the crank case in front of the crank shaft gear.

Fig. 3 a combination of two details in general cross section on the planes 3—3 and $3^a$—$3^a$ of Fig. 1, shows in the upper portion to the right, the transmission plug with the transmission case and an oil outlet element sectioned and arrows indicating the flow of oil; and showing in the lower left-hand portion of the figure, the flange of the crank case cover and the adjoining portion of the crank case in section and the oil inlet element sufficiently in section to indicate with the arrows the flow of oil. A portion of the oil tube contiguous to the outlet and inlet is shown with the main portion broken away.

Referring now to the drawings, A is the combined gear case (being the portion toward the left in Fig. 1) crank case (being the central portion) and transmission case (being the right-hand portion) provided with the cover $A^1$ for the gear case portion, the cylinder block $A^2$ forming a cover for the crank case portion, and a cover $A^3$ for the transmission case portion. The case A is kept partially filled with oil which is splashed about with the operation of the mechanism therein.

A magneto plug B of the usual type and located directly above the usual hole $a$, instead of being seated directly on the transmission case A has interposed between it and the transmission case, a thick washer C with a thin packing washer $c$ above and $c^1$ below, and the magneto plug B with the interposed washer C is secured to the cover $A^3$ by screws $s$ in the usual manner. A spring $t$ with or without the positioning plug $t^1$ is used in the usual way. The washer C is drilled and tapped radially to receive the nipple $c^2$ to which is secured a packing nut $c^3$ which securely holds the inlet end of the oil tube E in position. The depending flange or axial boss $b$ on the magneto plug B may be cut away at $b^1$ opposite the oil outlet, to permit a more ready flow of the oil outwardly, as indicated by the contiguous arrow, as it is splashed up through the opening $a$ into the chamber $c^4$ formed by the hole in the washer C. The tube E extends toward the front and downwardly where it is held at the front end by the nut $d^3$ and the nipple $d^2$ so as to make a continuous leak-tight passage from the washer C to the hollow stud D which takes the place of the ordinary stud or cap screw, securing the gear cover $A^1$ to the case A. The axial hole $d$ on the stud bolt D connects with the opening $d^1$ in the nipple $d^2$ and forms a continuous passage for the flow of oil from the oil tube E in the crank case.

The oil is splashed so violently in the transmission case that it is dashed through the opening in the transmission case cover into the chamber $c^4$ through the nipple $c^2$ and the oil tube E and through the stud D into gear case. The force of the flow is such as to cause the oil to spurt out the hole $d$ of the stud D. As before stated, the oil flows by gravity back through the gear case to the crank case and thence to the transmission case, completing the circuit.

I claim as my invention and desire to secure by Letters Patent of the United States:—

1. In combination with a splash-oiled internal combustion engine, a hollow member confined between the magneto plug and the transmission case, an oil outlet passage through the wall of said hollow member, a hollow stud forming an inlet for oil and substituted for one of the standard bolts securing the gear cover to the crank case, and an oil conduit from said hollow member to said hollow stud.

2. In combination with the splash-oiled engine of the Ford type, a thick washer confined between the magneto plug and the transmission case, an oil outlet passage through the wall of said washer, the contiguous base of said magneto plug being cut away to form an inlet passage to direct the oil splashed from the transmission case into said oil outlet, a hollow stud forming an inlet for oil and adapted to replace one of the standard bolts securing the gear cover to the crank case, and an oil conduit connecting said washer outlet to said stud inlet.

In testimony whereof I have hereunto set my hand in presence of two subscribing witnesses.

WILLIAM Y. HEADLEY.

Witnesses:
CARL PHARES,
NORMA D. BERGER.